UNITED STATES PATENT OFFICE

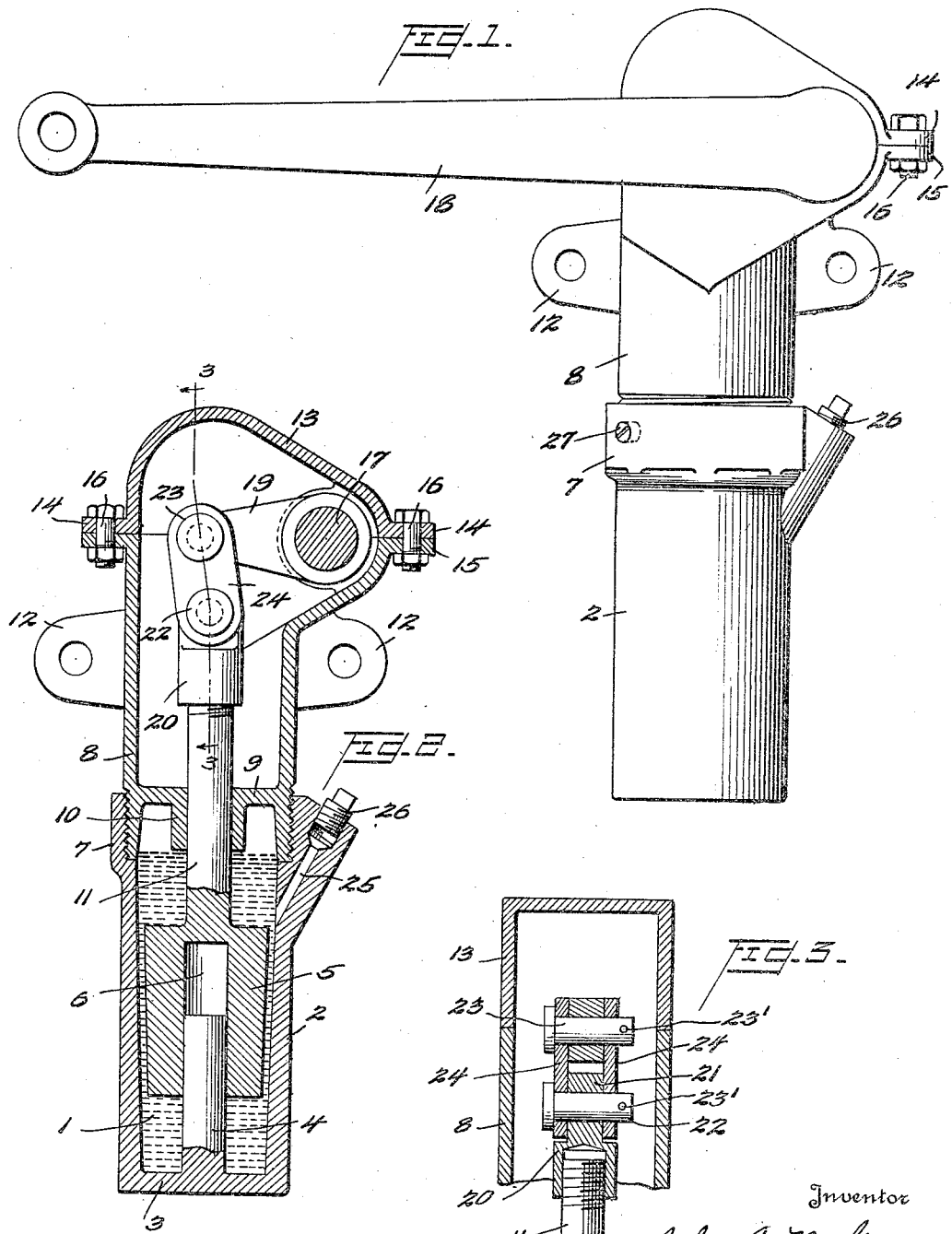

JOHN A. McGREW, OF ALBANY, NEW YORK

SHOCK ABSORBER

Application filed July 3, 1928, Serial No. 290,072. Renewed June 30, 1931.

The invention relates to improvements in shock absorbers adapted for use on motor cars and similar vehicles, that is, to such devices as are designed to control spring rebound when passing over rough or uneven roads, or unusual obstructions on paved surfaces.

The invention is directed particularly to shock absorbers of the hydraulic type in which the rebound or reaction of the spring on the vehicle body is largely minimized by means of a plunger reciprocating in a pressure chamber or cylinder against the resistance of a suitable fluid.

Previous devices of the general type have generally been found objectionable in practice on account of the more or less intricate and unreliable valve mechanisms employed to regulate the rate of flow of the resisting liquid from one side of the piston to the other, according to the successive positions of the plunger. Prior arrangements of operating parts have also been generally such as to require the use of stuffing boxes to render the casings reasonably liquid tight.

The object of the present invention is to provide an improved hydraulic shock absorber which will control and modify the effects of excessive rebound of the vehicle spring, with but little interference to the downward or compression movement of the spring. The invention contemplates a casing or pressure chamber secured to a vehicle member, filled with suitable fluid, and enclosing a plunger attached by appropriate means to a second vehicle member, movable with respect to the first. The relation between the plunger and casing wall is such as to provide an annular passage, the effective area of which, varies according to the position of the piston relative to the casing. The annular passage permits a quick and easy displacement of liquid from one side of the piston to the other for normal movements of the piston, but when the vehicle spring is expanded to an unusual degree, the area of the passage decreases directly proportional to the intensity of the reaction causing the rebound of the vehicle body. The arrangement has all the advantages of a finely regulated valve, but is without the necessary inherent weakness of valve mechanisms generally used in similar devices.

Another object of this invention is to provide a shock absorber, the casing walls of which may be adjusted relatively to the plunger to increase or decrease the cross-sectional area of the annular passage for any given position of the piston.

A further object of this invention is to provide a hydraulic shock absorber in which the piston head is made substantially longer than that in the usual form of shock absorber, for the purpose of providing an elongated annular conduit between the piston head and the casing wall, which will offer increased resistance to the flow of fluid. In the ordinary device in which a short cylindrical piston is used the resistance is based upon the principles of flow of fluid through an orifice, whereas in the applicant's device, the resistance is based upon the principles governing flow through a conduit. Furthermore, upon movement of the elongated tapered piston within the tapered casing or upon adjustment of the casing relatively to the piston, the elongated annular conduit will be rapidly diminished or increased in capacity, creating a correspondingly rapid increase or decrease in the resistance of the device. The oil or other suitable fluid in passing through this elongated conduit is not only subject to greater friction than if it were passing through an orifice, but it is also believed to be subject to a greater radial compressive stress between the approaching parallel walls of the conduit, than that developed in devices heretofore used. Stated somewhat differently, in the present case substantially the same diminution of volume of the annular conduit occurs as in the case of a cylindrical piston of the same diameter as the forward end of the present one, and slightly more fluid is displaced from one end of the piston to the other during a given forward movement thereof, but these quantities of fluid must pass through a considerably more restricted passageway than in the case of the cylindrical piston, and consequently the resistance to shock afforded by the use of the elongated tapered plunger is greater.

This improved arrangement is also effective in eliminating the necessity for packing glands for preventing leakages on account of the pressure of the fluid in the casing.

Another aim of the invention is to devise a shock absorber which is simple in construction, and made up of individual parts which can be manufactured easily and inexpensively, without the installation of special machinery other than that generally used in approved shop practice.

Other objects and features of novelty will be apparent from the following detailed description, when taken in connection with the accompanying drawings, in which one form of the invention is illustrated by way of example:

Figure 1 is a side elevation of the shock absorber;

Figure 2 is a vertical section through the center thereof on a plane parallel to the operating lever; and Figure 3 is a section on the line 3—3 of Fig. 2 looking in the direction of the arrows.

The pressure chamber 1 is contained within a circular casing 2 closed at the lower end thereof by a chamber head 3, formed integrally with the casing 2. Although in the preferred embodiment of the invention, the pressure chamber head 3 is made integral with the casing, this construction is obviously unnecessary, as such chamber head might well be secured to the casing by means of suitable flanges and bolts. The pressure chamber 1 has a circular cross section on any plane taken parallel with the chamber head 3. From an inspection of Figure 2, it will be observed that the walls of the casing of the pressure chamber, taper slightly from top to bottom so that the diameter of the extreme upper portion of the pressure chamber is somewhat in excess of that of the extreme lower portion of the pressure chamber.

The circular stud 4 is rigidly, integrally or otherwise, formed on the inside of the pressure chamber head 3, thereby projecting into the pressure chamber 1.

Mounted for sliding motion in the pressure chamber is the piston 5. The lower face of the piston is provided with a cylindrical opening 6, which, for all positions of the piston, has a sliding but substantially fluid tight fit with stud 4. The piston 5 has also a circular, horizontal cross section and tapers from the upper to the lower face at an angle similar to that of the walls of the pressure chamber.

The upper end of the casing 2 is enlarged slightly as at 7 to accommodate the lower threaded end of a second casing 8. Near its lower end, casing 8 is provided with a partition 9 which forms the upper head of the pressure chamber. A short boss 10 formed on the partition 9 serves as a bearing and guide for piston rod 11, secured at its lower end to the piston 5. Ears 12 formed on a casing 8 afford means for attaching the body of the device to a vehicle frame in the usual manner. The upper end of casing 8 is closed by means of a cap 13 provided on its lower edges with flanges 14 which cooperate with similar flanges 15 on the upper edge of casing 8. Cap 13 is secured to the casing 8 by means of bolts 16.

The upper edge of the casing 8 and the lower edge of cap 13 cooperate to provide bearings for shaft 17 which has attached to one end thereof the lever 18 which affords means for connecting the movable piston to the vehicle axle in the customary manner.

Midway of its bearings, shaft 17 has integrally formed therewith a short arm 19. A cap 20 is threaded to the upper end of the piston rod 11 and is provided with a projection 21 drilled to accommodate a pin 22. The free end of arm 19 is similarly drilled to receive pin 23. Links 24 are each held in place by pins 22 and 23 and serve as a flexible connection between arm 19 and piston rod 11. Suitable cotters 23' maintain the pins and associated parts in position.

Casing 2 is provided with a small passage 25 for the purpose of filling the pressure chamber 1 with oil or any suitable liquid. Passage 25 is closed by plug 26. The enlarged portion 7 of casing 2 is drilled to receive a short set screw 27.

The operation of the shock absorber will be readily followed. For greatest efficiency, the pressure chamber 1 is filled with liquid up to the level shown in Figure 2, i. e., to the lower end of boss 10. As is customary practice, the casing 8 is attached to the frame of the vehicle and the lever 18 connected to the axle. In Figure 2 it will be observed that on account of the unfilled upper portion of the pressure chamber, any upward movement of the piston 5 will be practically unopposed. On a compression movement of the spring, the casing 2 moves downwardly and piston 5 moves upwardly on account of its connection with the axle through lever 18. As the annular passage between piston 5 and the walls of the pressure chamber becomes continually enlarged, oil above the piston head will readily pass around the piston into the lower end of the pressure chamber. This, in conjunction with the unoccupied space from the top of the pressure chamber, insures a compression movement of the spring which is practically unretarded by the shock absorber.

On the rebound, the pressure chamber 2 moves upwardly, and piston 5 downwardly. It will be apparent that as piston 5 approaches the chamber head 3, the annular passage between the piston and the walls of the pressure chamber becomes gradually more restricted, thereby offering increased resistance to the downward movement of the piston.

The stud 4, while primarily acting as a centering device and serving to provide a more rigid construction, forms along with the opening 6 in the piston head, a supplementary cushioning means by compressing the small amount of entrapped air within the opening during the downward stroke of the piston.

On account of the threaded connection between casing 8 and casing 2, and the associated set screw 27, casing 2 may be raised or lowered to increase or decrease the cross sectional area of the annular passage between the piston and the casing 2 for any fixed position of the piston. This arrangement affords an adjustment whereby the resistance to the rebound may be increased or decreased within certain limits.

For the reason that there is practically no fluid pressure in chamber 1 during the upward stroke of piston 5, there is very little, if any, tendency for the oil to be forced up through boss 10 around piston rod 11. The unoccupied space between the upper level of the oil and the partition 9 permits sufficient movement of the oil above the piston head for normal movements of the piston to eliminate any leakage from chamber 1 up into the interior of casing 8. It is furthermore quite obvious that any oil which does work its way up past partition 9 will, under normal operation of the device, tend to flow back into the pressure chamber 1.

Having thus described the invention, what is claimed as new and desired to be secured by Letters Patent is:

1. In a shock absorbing device, a casing secured to a vehicle member, a second casing closed at one end and connected at the other end to said first named casing, said second named casing adapted to contain a fluid, a piston movable therein and having lever connection with a second vehicle member, an annular passage between the piston and the second named casing, the relation between the piston and the casing being such as to vary the effective area of said passage according to the position of the piston, and means for adjusting said second named casing relative to said first named casing to vary the cross sectional area of the passage for any given position of the piston.

2. In a shock absorbing device, a casing closed at one end, a pressure chamber in said casing tapering toward one end thereof, a tapered piston movable in said pressure chamber, a stud rigidly secured to the closed end of the casing of such length as to continually slidably engage an opening of similar cross section in the piston head, a second casing connected to the first mentioned casing and adapted to be attached to a vehicle member, a partition in said second casing forming a head for the pressure chamber, a piston rod projecting through said head, a lever adapted to be attached to a second vehicle member and means housed in said second casing to connect said lever and piston rod.

3. In a shock absorbing device, a casing closed at one end, a circular pressure chamber in said casing tapering toward one end thereof, a tapered piston movable in said pressure chamber forming an annular passage of variable cross section between the casing and the piston, a circular stud rigidly secured to the closed end of the casing of such length as to continually slidably engage an opening of similar cross section in the piston head, a second casing connected to the first mentioned casing and adapted to be attached to a vehicle member, a partition in said second casing forming a head for the pressure chamber, means to adjust the effective area of the annular passage for any given position of a piston, a piston rod projecting through said head, a lever adapted to be attached to the second vehicle member and means housed in said second casing to connect said lever and piston rod.

4. In a shock absorbing device, a casing closed at one end, a pressure chamber in said casing tapering toward one end thereof, a correspondingly tapered piston movable in said pressure chamber, a second casing connected to the first mentioned casing and adapted to be attached to a vehicle member, a partition in said second casing forming a head for the pressure chamber, a piston rod projecting through said head and having a fluid tight fit therewith, said piston rod and said head together forming an imperforate end closure for said casing, a lever adapted to be attached to a second vehicle member and means housed in said second casing to connect said lever and piston rod.

In testimony whereof I hereunto affix my signature.

JOHN A. McGREW.